United States Patent
Pichahchi

(10) Patent No.: US 7,522,410 B2
(45) Date of Patent: Apr. 21, 2009

(54) PROTECTIVE CASE FOR PORTABLE COMPUTER

(75) Inventor: Vadim Pichahchi, Mountain View, CA (US)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 11/367,573

(22) Filed: Mar. 2, 2006

(65) Prior Publication Data
US 2007/0119734 A1   May 31, 2007

Related U.S. Application Data

(60) Provisional application No. 60/740,116, filed on Nov. 28, 2005.

(51) Int. Cl.
*G06F 1/16* (2006.01)
(52) U.S. Cl. ......... 361/683; 206/320; 248/918; 190/115
(58) Field of Classification Search ......... 206/320, 206/576; 190/117, 115; 248/205.2, 918; 361/679–687, 724–727
See application file for complete search history.

(56) References Cited

U.S. PATENT DOCUMENTS

| | | | | | |
|---|---|---|---|---|---|
| 4,206,835 | A | * | 6/1980 | Shapiro | 190/108 |
| 6,109,434 | A | | 8/2000 | Howard, Jr. | |
| 7,303,077 | B2 | * | 12/2007 | Harlocker | 206/576 |
| 2006/0221565 | A1 | * | 10/2006 | Doherty et al. | 361/683 |
| 2006/0272968 | A1 | * | 12/2006 | Swaim et al. | 206/320 |

* cited by examiner

*Primary Examiner*—Hung V Duong
(74) *Attorney, Agent, or Firm*—Baker Botts L.L.P.

(57) ABSTRACT

A protective case for a portable or laptop computer is shown. The case is designed to allow use of the computer without the need to remove it from the case. The bottom wall of the case has an attachment mechanism for holding the computer securely in place while the case is open. Angled brackets in the bottom wall and extending upward into the side wall, define a hinge portion of the case. The upper wall of the case includes a display holder for slidably holding the computer display. The display holder holds the top wall of the case to the display while allowing relative motion between the two. A rear access opening in the rear side wall panel allows access to connectors and ports at the rear of the computer so that they can be used while the computer remains in the case. A flap may be coupled to rear access opening, to allow the opening to be securely covered when not in use. A rear vent, covered with a mesh material, may also be incorporated into the rear panel to facilitate air circulation. Preferably, the bottom wall includes a hand strap and an antiskid pad, and the top wall includes an accessories pocket.

15 Claims, 2 Drawing Sheets

PROTECTIVE CASE FOR PORTABLE COMPUTER

CROSS-REFERENCE TO RELATED APPLICATION

This application claims priority to U.S. Provisional Patent Application Ser. No. 60/740,116, filed on Nov. 28, 2005, the entire disclosure of which is incorporated by reference.

FIELD OF THE INVENTION

The present invention is related to means for protecting portable electronic devices, and is particularly related to a protective case for a laptop computer.

BACKGROUND OF THE INVENTION

Laptop computers, also known as "notebook" or "portable" computers, are widely used. Such computers generally comprise a "clamshell" design, wherein a bottom member, comprising a keyboard, touchpad, etc., is rotatably attached to an upper display portion using one or more hinges. As used herein, the term "laptop" computer is also intended to cover "tablet" computers and "convertible" computers.

A primary advantage of such computers is their portability. Accordingly, a variety of portable carrying cases has been developed for transporting laptop computers. Laptop computers are generally delicate systems, and the primary function of known carrying cases is to protect the computer while it is being transported. A secondary function of known laptop computer carrying cases is for carrying associated items, such as power cords, disks, mice, cables, etc., that are used with the device.

There are many situations where it would be desirable to enable the user of a laptop computer to have the ability to use the computer without removing it from its case. However, known laptop cases are not optimized to enable use computer users to operate their laptops without removing them from their cases.

SUMMARY OF THE INVENTION

The present invention is generally directed to a protective case for a laptop computer that has various features to facilitate use of the computer without removing it from the case. In accordance with one embodiment of the invention, the case has a body having a bottom wall, a top wall, and a peripheral side wall therebetween, wherein the bottom wall has an attachment mechanism to securely hold the base of a laptop computer; the top wall has a display holder for slidably coupling the top wall to a laptop computer display; and the side wall has a closing mechanism for connecting the top and bottom walls of the case in a closed position, and a rear access opening. The top and bottom walls can be closed using a zipper, and the attachment mechanism for holding the base of the computer may be a hook and loop fastener, such as VEL-CRO® strips. The display holder may comprise two angled strips of material positioned at the upper corners of the inside surface of the top wall. The rear access opening may include a closure mechanism, so that the opening can be closed when not in use, and the closure mechanism may comprise a flap including a fastener, such as VELCRO® strips, such that the flap can be securely fastened to the side wall when the opening is not in use. The protective case may also have a vent on said side wall, and the vent opening may be covered with a mesh. The case in general, and the side wall in particular, may be made of a soft material, such as ballistic nylon, and may have at least one rigid bracket attached to the rear of the bottom wall thereby defining a hinge region in the side wall. Preferably, the case comprises both an integral small handle and connectors, such as D-rings, for attaching a secondary carrying strap, such as a shoulder strap. In addition, the case preferably includes a hand strap on the exterior of said bottom wall, and an antiskid pad on the exterior of said bottom wall. The antiskid pad is, preferably, at least one centimeter thick.

BRIEF DESCRIPTION OF THE DRAWINGS

The foregoing aspects and the attendant advantages of this invention will become more readily apparent by reference to the following detailed description when taken in conjunction with the accompanying drawings, wherein.

Reference symbols are used in the Figures to indicate certain components, aspects or features shown therein, with reference symbols common to more than one Figure indicating like components, aspects or features shown therein. It is noted that none of the figures used to describe the present invention are drawn to scale, and various features and dimensions are exaggerated to facilitate the discussion.

DETAILED DESCRIPTION

In general, the present invention is directed to a case for a laptop computer which has a variety of features to facilitate use of the computer without removing it from its case.

Figure 1:
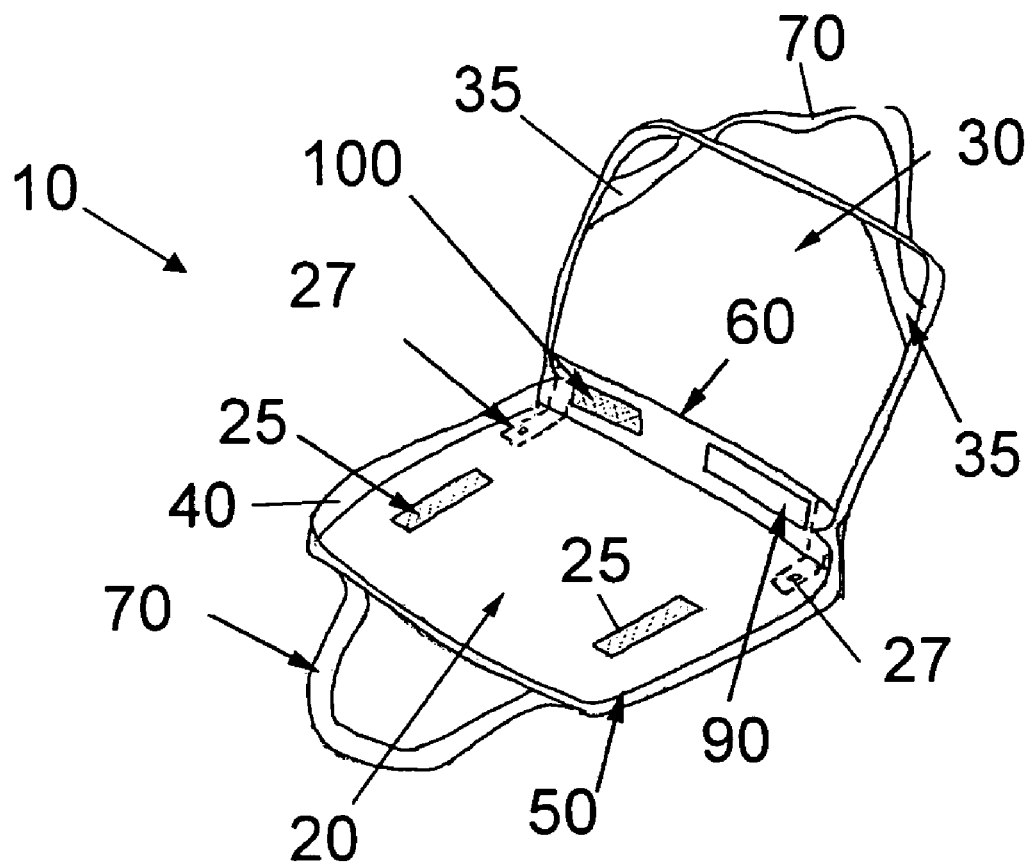
FIG. 1 is a front view of a laptop case, in accordance with an embodiment of the present invention, in the open position.
Figure 2:
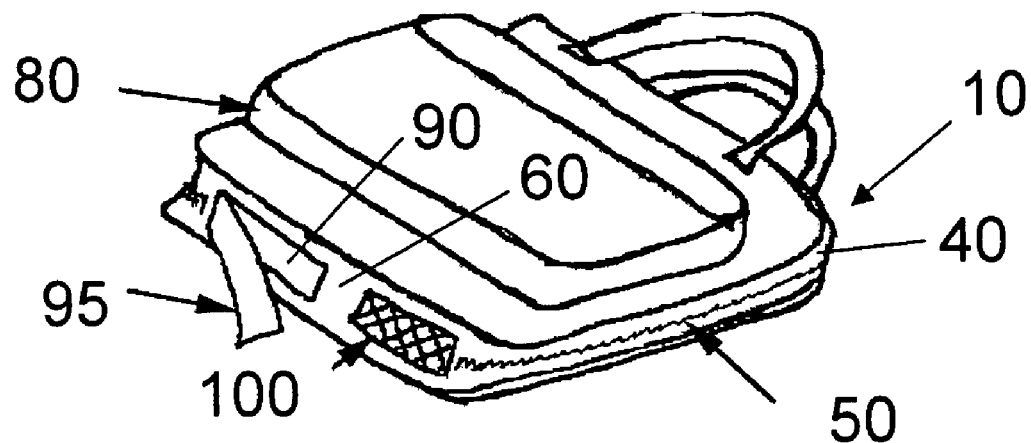
FIG. 2 is a rear view of a laptop case, in accordance with an embodiment of the present invention, in the closed position.
Figure 3:
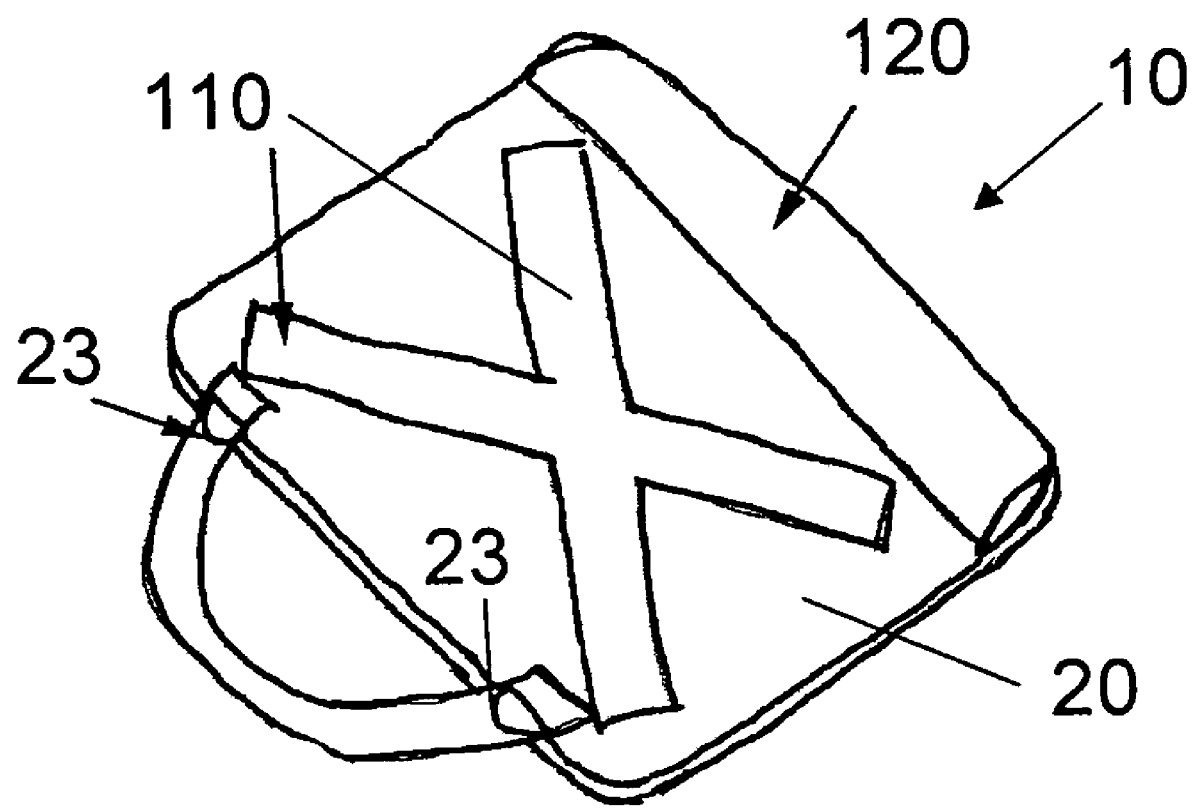
FIG. 3 is a view of the bottom of a laptop case in accordance with an embodiment of the present invention.

An exemplary embodiment of the case 10 of the present invention is depicted in FIGS. 1-3. Turning first to FIG. 1, there is shown a perspective front view of the exemplary case 10 in the open position. Case 10 is intended for use with a laptop computer, which is broadly defined to include laptop, notebook, convertible, tablet and other types of portable computing devices. A common feature of such devices is their general "clamshell" design. Such a computer typically comprises a base or bottom computer portion having a keyboard and, often, some type of a pointing device such as a touchpad or trackball integrated therein, and a top computer portion rotatably attached to the bottom portion having a display. The top and bottom portions are attached by one or more hinges, allowing the computer to be opened and closed as needed. In some instances, as with tablet or convertible computers, the top and bottom portions may be detachable from each other. While the case of the present invention is intended for use with such computers, the computers themselves are not considered part of the present invention and, therefore, they are not shown in the figures and will not be described in greater detail.

Case 10 comprises a bottom wall 20, a top wall 30 and a side wall 40, which may be made of a soft but strong material, such as ballistic nylon. In a preferred embodiment, stiffening sheets (not shown) are incorporated into bottom and top walls 20, 30, respectively, to provide more rigidity and protection. Such stiffening sheets may be relatively thin layers of a suitable plastic or similar material. Preferably, bottom wall 20 and top wall 30 both have a handle 70 attached thereto for carrying the case. In addition, one or more connectors, such as D-rings 23 (shown in FIG. 3) are mounted on the case, preferably at the seam between the side wall and either the top or bottom wall. The connectors allow a carrying strap, such as a shoulder strap, to be removably attached to case 10.

Side wall 40 has a zipper 50, or other closing mechanism, extending around three panels of the side wall. The fourth side wall panel, i.e., rear side wall panel 60 is essentially a solid piece of material, which may have openings as described below in connection with FIG. 2. Thus, when zipper 50 is closed, the computer is securely enclosed within case 10, and when zipper 50 or other closing mechanism is opened, the computer can be opened and used without removing it from the case. As described herein, several features of the case of the present invention are designed to facilitate use of the computer while it remains in situ.

Bottom 20 comprises an attachment mechanism to securely hold the base of the laptop computer. As shown in FIG. 1, hook and loop (i.e., "VELCRO"®) strips 25 may be attached to the interior surface of bottom 20 to couple with mating strips attached to the laptop. A hook and loop fastener is preferred because of its ability to provide secure but removable attachment between the computer and the base. In one embodiment, the hook portion of the fastener is attached to case bottom 20, and the case is furnished with mating loop portion strips, with adhesive backing, so that the computer user can attach them at appropriate positions at the bottom of the computer. While two VELCRO strips are shown in FIG. 1, more than two may be used to attain a stronger attachment.

The bottom wall 20 of case 10 further comprises at least one, and preferably two, angle brackets 27 securely attached thereto. Angle brackets 27 may be securely attached by riveting them to the plastic sheet (described above but not shown) used to stiffen bottom wall 20. Angle brackets 27 are positioned at the rear of bottom wall 20, with a portion of each bracket extending upward at the interface between bottom wall 20 and rear side wall panel 60 in order to maintain the bottom wall and the rear side wall panel in an orthogonal relationship. Angle brackets may also be riveted, or otherwise attached, to a plastic sheet in rear side wall panel 60. It will be appreciated that the brackets help define a "hinge" portion of the case, extending along the top of rear side wall panel 60. This "hinge" portion allows top wall 30 to rotate as the case is opened.

Top wall 30 comprises a display holder for slidably coupling the top wall to a laptop computer display. In the embodiment shown, the display holder comprises a pair of angled strips 35 positioned on the interior of top wall 30, near the top of the computer display. Angled strips 35 are preferably made of a thin, flexible plastic, and may be attached at the end thereof at the seam between top wall 30 and side wall 40. In use, the computer display is inserted beneath angled strips 35 (i.e., between the strips and the adjacent interior surface of the top wall) and remains there as long as the computer is in the case. The strips are preferably sufficiently thin to allow the computer to close while they are in place, and are sufficiently strong to withstand repeated opening and closing of the computer. Since the hinge of the computer and the hinge of the case define different (i.e., offset) axes, top wall 30 will move relative to the computer display section as the computer is rotated into an open, working position. Therefore, an important feature of the present invention is that it accommodates this motion while keeping top wall 30 attached to the display. In other words, strips 35 allow top wall 30 to slide relative to the computer display.

FIG. 2 shows additional features of case 10 according to an exemplary embodiment of the present invention. Thus, for example, the exterior of top wall 30 may comprise one or more pockets 80 which may be used, for example, for carrying items likely to be transported with the computer, such as power cords, network and phone cables, external pointing devices (e.g., mice), and the like.

FIGS. 1 and 2 also show a rear access opening 90 in rear side wall panel 60. As is well known in the art, laptop computers typically have various types of connectors and ports positioned on the computer rear wall, such that rear access opening 90 allows the user to use these while the computer remains in case 10. Preferably, access opening 90 has a flap 95 attached to rear side wall panel 60 adjacent to the opening. One end of flap 95 is firmly attached to the case, and the other end is removably attachable to the case, allowing the flap to be opened and closed. The removable attachment mechanism may be a snap or a hook and loop ("VELCRO") fastener. The flap and associated attachment mechanism allow the flap to be securely closed when access to the rear of the computer is not needed. Although FIG. 2 shows the flap as hinged at a side thereof, the flap may, instead, be hinged at the bottom or other location. The dimensions and position of rear access opening 90 may be dependent on the positioning of the ports and connectors for which access will be provided. Thus, in one embodiment, the case is designed with a particular specific computer in mind, and the opening is positioned and sized accordingly.

FIGS. 1 and 2 also show a vent 100 in the rear side wall of case 10, to facilitate airflow necessary to cool the computer. Vent 100 may comprise a mesh covering. In one embodiment of the present invention, comprising a case which is intended to be highly versatile, flap 95 extends substantially the entire length of rear side wall panel 60, and the entire length of the flap is made of a mesh. In this embodiment, the case can be used with many computers which may be different in respect to the positioning of ports, connectors, vents, etc.

FIG. 3 depicts a bottom view of case 10, showing additional features of the invention. A hand strap attached to bottom wall 20 may be used to securely hold the computer in an open, working position with one hand, such that the computer may be operated with the other hand. As depicted, the hand strap may comprise a pair of crossed elastic strips 110. The elasticity of strips 110 is, preferably, very firm, so that the user's hand does not move easily once inserted into the hand strap. The use of crossed strips allows the user to easily insert his or her entire hand beneath the strap, preferably with the palm facing upward. The palm up position is a natural holding position, allowing comfortable use of the computer.

As is further depicted in FIG. 3, the exterior surface of bottom wall 20 also comprises an antiskid pad 120. When case 10 is resting on a surface in a working position, antiskid pad 120 prevents the case from moving or sliding on the surface. Antiskid pad 120 preferably has a flexible, frictional surface. Moreover, preferably pad 120 is relatively thick, for example about one centimeter or more. This thickness, in connection with the flexibility of the pad, helps the pad conform to any surface irregularities, thereby assuring good contact with an uneven surface. In addition, the thickness tends to raise the rear of the computer and angle the keyboard into a better working position.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are not intended to be limiting of the scope of the invention, which is set forth in the following claims.

What is claimed is:

1. A protective case for a laptop computer, comprising:
   a body having a bottom wall, a top wall, and a peripheral side wall therebetween, wherein:
   said bottom wall comprises an attachment mechanism to securely hold the base of a laptop computer;
   said top wall comprises a display holder for slidably coupling the top wall to a laptop computer display; and,
   said side wall comprises a closing mechanism for connecting said top and bottom walls in a closed position, a vent, and a rear access opening.

2. The protective case of claim 1, wherein said display holder comprises two angled strips of material positioned at the upper corners of the inside surface of said top wall.

3. The protective case of claim 1 wherein said rear access opening comprises a closure mechanism, so that the opening can be closed when not in use.

4. The protective case of claim 3, wherein said closure mechanism comprises a flap.

5. The protective case of claim 4 wherein said closure mechanism comprises Velcro, such that said flap can be securely fastened to said side wall when the opening is not in use.

6. The protective case of claim 1, wherein said vent comprises a mesh.

7. The protective case of claim 1 wherein said closing mechanism comprises a zipper.

8. The protective case of claim 1 wherein said attachment mechanism comprises Velcro strips.

9. The protective case of claim 1 wherein said side wall is made of a soft material.

10. The protective case of claim 9 further comprising at least one rigid bracket attached to the rear of the bottom wall thereby defining a hinge region in said side wall.

11. The protective case of claim 1, further comprising a handle.

12. The protective case of claim 1, further comprising a hand strap on the exterior of said bottom wall.

13. The protective case of claim 1, further comprising an antiskid pad on the exterior of said bottom wall.

14. The protective case of claim 13, wherein said antiskid pad is at least one centimeter thick.

15. The protective case of claim 1, comprising at least two connectors for receiving a carrying strap.

* * * * *